UNITED STATES PATENT OFFICE.

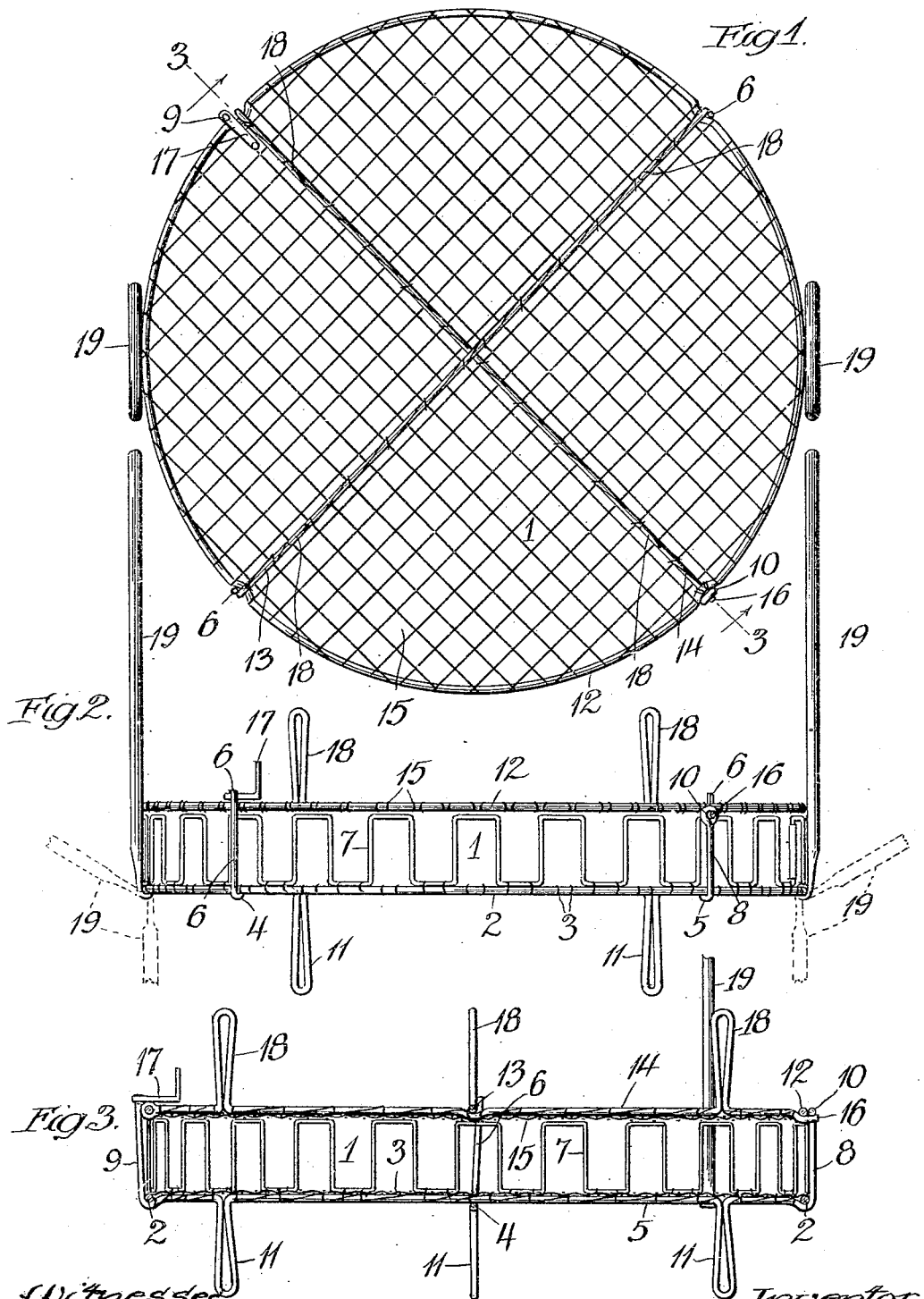

BENGMAN W. FORGUE, OF CHICAGO, ILLINOIS.

DOUGHNUT-FRYER.

955,507.  Specification of Letters Patent.  Patented Apr. 19, 1910.

Application filed May 20, 1909. Serial No. 497,225.

*To all whom it may concern:*

Be it known that I, BENGMAN W. FORGUE, a citizen of the United States, and residing at Chicago, in the county of Cook and State of Illinois, have invented a new and useful Improvement in Doughnut-Fryers, of which the following is a complete specification.

This invention relates to improvements in doughnut fryers, and more particularly to a doughnut fryer adapted to simultaneously turn the doughnuts while cooking.

Heretofore in frying doughnuts it has been usual to place the dough directly into a kettle or other cooking utensil containing the hot lard. The raw doughnuts after being formed into proper shape are dropped one by one into the hot lard and as each becomes cooked on one side it is turned over to permit it to be cooked on the other side. Such a method of operation does not permit of the doughnuts being placed in the kettle simultaneously and requires the almost constant attendance of the cook at the side of the kettle to turn the doughnuts as they become cooked on one side, and to remove them individually when completely done. As a consequence the doughnuts are not cooked uniformly.

The objects of this invention are to provide a doughnut fryer adapted to receive the raw doughnuts and together therewith to be placed into the hot lard in the cooking utensil; to provide a device adapted to simultaneously place the doughnuts into the hot lard so that they will cook uniformly on one side and be ready to be turned simultaneously; to provide a doughnut fryer adapted to simultaneously turn the doughnuts in the cooking utensil, and to provide a device adapted to greatly reduce the labor and inconvenience usually required in cooking doughnuts, as well as to produce a more uniform grade of doughnuts.

A specific construction embodying this invention is illustrated in the accompanying drawings, in which:

Figure 1 is a top plan view of a doughnut fryer embodied in this invention. Fig. 2 is a side elevation of the same. Fig. 3 is a section taken on line 3—3 of Fig. 1.

In the construction shown, the basket or receptacle 1 is adapted to contain the dough while cooking and is preferably cylindrical in shape, and is of a diameter to seat in the kettle or other utensil containing the hot lard. The basket is formed of open work to permit free circulation of the lard therethrough and comprises a bottom or end frame member 2 which is formed of an annular rod or large gage wire, and stretched over said member and rigidly secured thereto is a sheet of wire netting or screen 3 of relatively large mesh. Extending across the frame member and rigidly secured thereto and to the outer side of the screen 3 are the stay rods 4 and 5. Said stay rods, as shown, extend diametrically across the end member, and at right angles to each other, and the rod 4 has its ends 6 turned upwardly on the outer side of the basket and they project above the side walls 7 of the basket. The ends 8 and 9 of the rod 5 likewise extend above the side walls 7 and the former is provided with an eye 10 at its top. Each of said stay rods 4 and 5 is provided at a point near each end with a downwardly directed loop forming legs 11 by means of which the basket is supported in an upright position out of contact with the bottom of the kettle.

The side wall 7 is formed of wire bent to provide a plurality of upwardly extending loops and is rigidly secured to the annular frame member 2 by means of a part of the strands of the screen extending around the base of the loops and said frame member 2. Said side wall is also soldered to the frame member 2 and to the screen and the screen is soldered to the member 2 and stay rods 4 and 5.

The cover comprises an annular frame member 12, similar to the member 2, and having cross stays 13 and 14 rigidly secured thereon. Rigidly secured to the inner side of said frame member 12 and stays 13 and 14 is a screen or wire net 15 similar to the screen 3. One end 16 of the stay 14 projects beyond the member 12 and is adapted to be inserted into the eye 10 when the cover is in place. The upwardly projecting ends of the stay 4 hold the cover from lateral movement, and on the end 9 of the stay 5 is a swinging catch 17, adapted, when the cover is in closed position, to be turned inwardly over the same and hold it in place. Each of the stays 13 and 14 are likewise provided with legs 18, which are adapted to support the basket free from the bottom of the kettle when the basket is inverted.

Pivoted or hinged on diametrically opposite sides of the basket are the handles 19 by means of which the basket may be lifted into or out of the kettle and inverted. Said handles, as shown, are hinged to the bottom frame member 2 though they may be hinged to the side walls 7 if preferred and each is adapted to swing outwardly away from the side wall, in the opposite direction from the other.

The operation of the construction shown is as follows: The basket is normally supported in its upright position upon the legs 11. The raw doughnuts are placed in the basket and the cover is secured in place. The basket is then lifted by the handles 19 and set into a kettle of hot lard where it is supported out of contact with the bottom of the kettle by the legs 11. Preferably the lard will be of such depth that it will not reach to the top of the basket, thereby permitting the doughnuts to rise and float on the lard in the usual manner while cooking, without touching the cover so as to prevent their becoming marred or distorted. When the doughnuts are sufficiently cooked on one side the basket is lifted from the kettle and turned over by means of the handles 19. In turning the basket over the handles are spread or swung outwardly from the basket to an approximately horizontal position or into alinement with each other and they are then given a half revolution, thereby turning the basket over. The handles will then be again directed upwardly from the basket and the basket is lowered into the kettle and supported on the legs 18. When the doughnuts are done the basket is removed from the kettle and set right side up and the cover is removed. The cooked doughnuts may then be removed from the basket and the basket refilled and the operation repeated. Obviously all of the doughnuts contained in the basket will be cooked uniformly on each side and a great deal of the labor and care required in standing over the kettle and turning and removing the doughnuts individually is obviated by this invention.

While but one specific embodiment of this invention has been herein shown it will be understood that many details of the construction shown may be varied or omitted without departing from the spirit of this invention.

I claim:

1. A doughnut fryer comprising an open work basket having cross stays on the bottom thereof with upturned ends, legs on said stays, an eye on one of said upturned ends, a catch pivoted on the other upturned end of the same stay, a cover having cross stays thereon, one end of one of which is adapted to engage in said eye, legs formed on the cover cross stays, and handles pivoted on opposite sides of the basket and adapted to swing outwardly therefrom.

2. The combination with an annular frame member, of wire netting secured thereon, open work side walls extending upwardly from said member, cross stays secured to said member and said netting and having upturned ends extending above said side walls, legs formed on said stays, an upper annular frame member, wire netting secured on said upper member, cross stays on said upper member and netting, legs on said stays, means removably securing said upper member above the side walls, and outwardly swinging, oppositely disposed handles pivoted on the lower frame members.

3. The combination with a pair of annular frame members, cross stays on the outer side of each member, those on one member having their ends directed toward the other member, wire netting secured on each member and its stays, open work side walls secured to one of said members and extending to the other member, interlocking means on the stays of said members, legs extending outwardly from said stays, and oppositely disposed handles pivoted on one of said members.

4. The combination with open work side walls, of an open work end wall rigidly secured to one end thereof, an open work end wall removably secured to the other end of said side walls, cross stays on said end walls, each having outwardly directed legs thereon, the ends of the stays on one end wall being turned parallel with the side walls and extending beyond the same, an eye on one of said ends adapted to receive the end of one of the stays of the other end wall, a catch on one of said ends adapted to secure the removable end wall in place, and handles pivoted on one end wall and adapted to carry the construction thus formed either side up.

In testimony whereof I have hereunto subscribed my name in the presence of two witnesses.

BENGMAN W. FORGUE.

Witnesses:
W. W. WITHENBURY,
THOMAS J. JOHNSON.